Sept. 2, 1958  S. G. ANDERSSON  2,849,783
APPARATUS FOR SHRINKING KNITTED FABRIC
Filed June 22, 1956  2 Sheets-Sheet 2
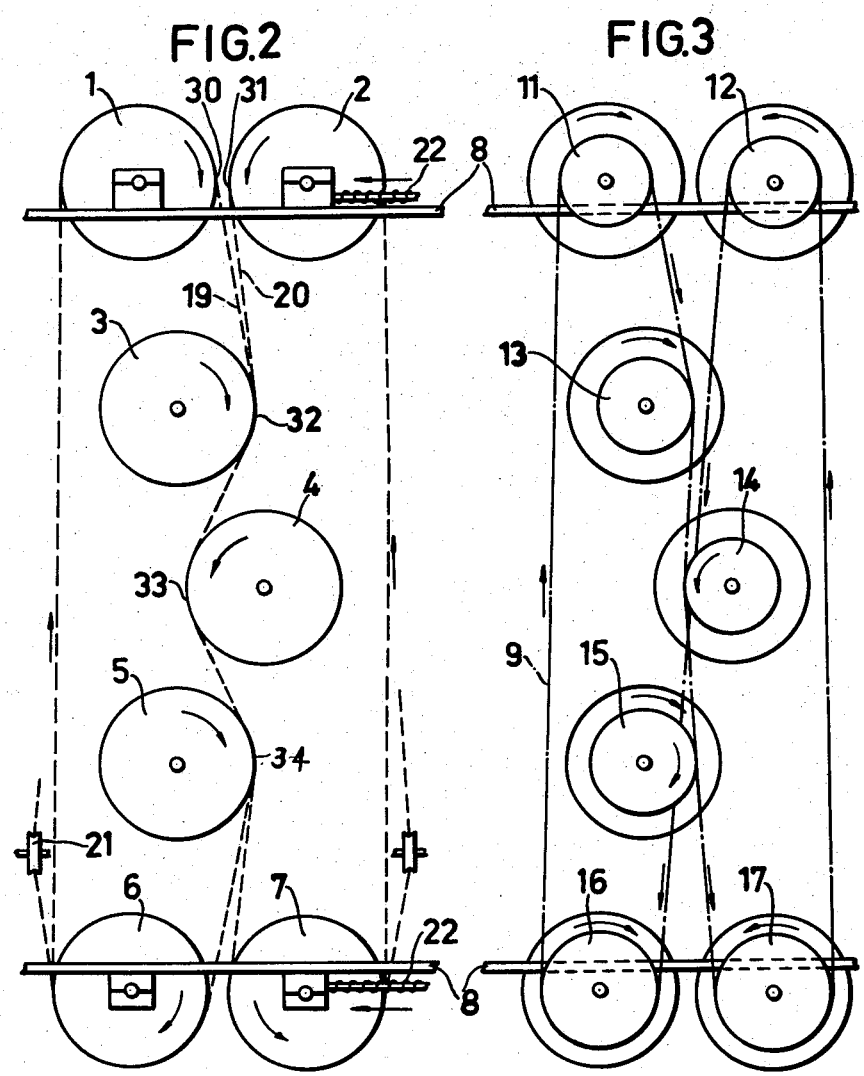
INVENTOR.
Sven Gerhard Andersson
BY
Pierce Scheffler & Parker
Attorneys United States Patent Office
2,849,783
Patented Sept. 2, 1958

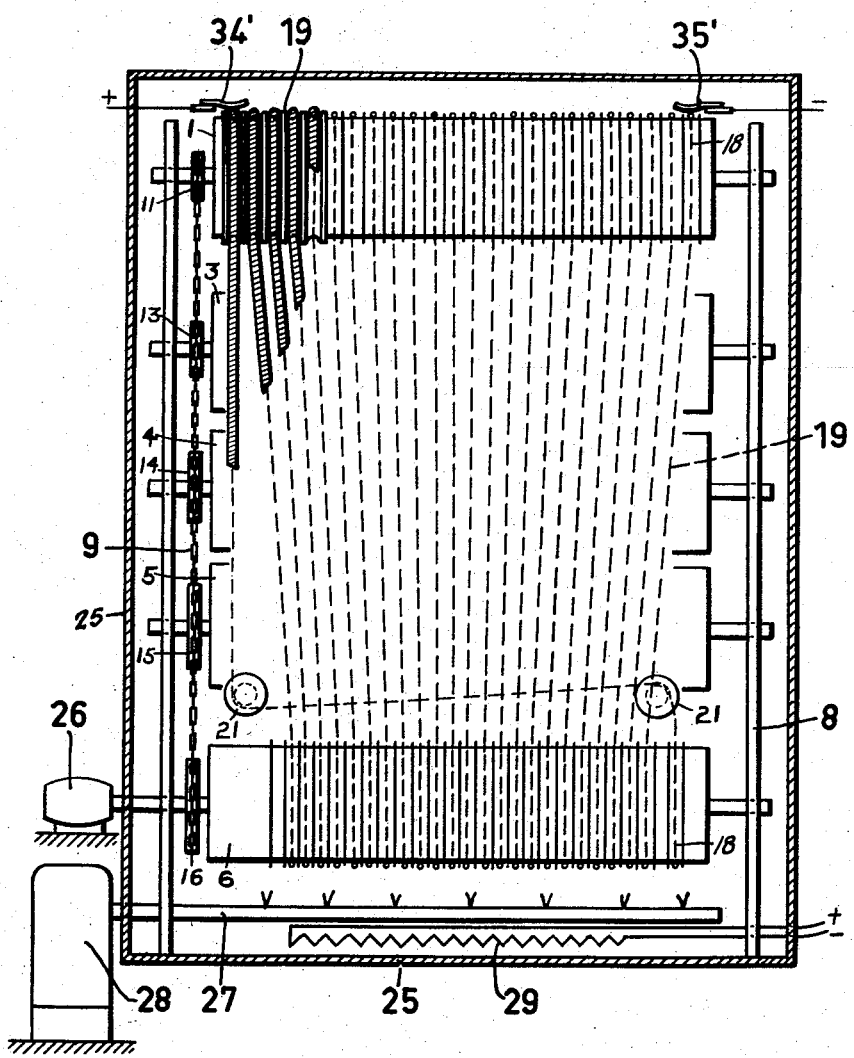

2,849,783

APPARATUS FOR SHRINKING KNITTED FABRIC

Sven Gerhard Andersson, Ljungskile, Sweden

Application June 22, 1956, Serial No. 593,296

2 Claims. (Cl. 26—18.6)

It is also known to shrink fabric by letting the fabric pass between two webs, which are formed by endless helical springs conducted over rollers, which springs are contracted, the course being carried out by supplying steam, which partly moistens the fabric and partly emits heat to the helical springs, which in turn emits heat to the fabric for the shrinking. Such an arrangement is illustrated in a co-pending United States patent application Serial No. 409,992, filed February 12, 1954 in the name of Karl Isac Joal Rosen and assigned to the present applicant.

Tests made, however, have proved that a better result is obtained if the helical springs are heated electrically.

Therefore, according to the present invention electric current is conducted through the helical springs which are heated by the resistance of the current. The current can be supplied to and removed from the helical springs by means of sliding contacts, which either slide against the springs or against a pair of rollers round which the helical springs run.

The invention is illustrated by an embodiment shown in the accompanying drawings in which Fig. 1 is a vertical sectional view of the housing for the apparatus and with the rollers and endless springs of the machine shown in elevation; Fig. 2 is a diagrammatic side view of the rollers and endless springs; and Fig. 3 is a side view of the rollers with the driving chain.

In the drawings, the reference numerals 1-7 designate rollers of equal diameter mounted in a frame 8, the two upper rollers 1, 2 and the two lower rollers 6, 7 respectively are placed opposite each other, while the other rollers 3, 4, 5 are placed in staggered relation between the upper and lower pairs of rollers. The rollers 1-7 are driven by an endless chain 9 by means of chain wheels 11-17 connected with the rollers 1-7. The chain wheels 11 and 12 for driving the two upper rollers 1, 2 have equal diameters as have also the chain wheels 16, 17 for driving the lower rollers 6, 7 but the diameters of the latter two chain wheels are greater than those of the upper rollers, while the diameters of the chain wheels 13, 14 and 15 for driving the interjacent rollers 3, 4 and 5 respectively increase gradually from the top downwards, so that the velocity of the rollers decreases gradually from the top downwards. The rollers 1, 3, 5 and 6 on one half or side of the machine are driven in the opposite direction from that in which the rollers 2, 4 and 7 are driven. the rollers are provided with peripheral wedge-shaped grooves 18, the grooves being closer as the diameters of the chain wheels of the rollers increase.

As indicated in Fig. 2, one endless helical spring 19 forming one web and made of electrically conductive material is placed in the grooves 18 of the rollers 1, 3, 4, 5 and 6 and is driven in the direction indicated by the arrow. A second endless helical spring 20 and also made of electrically conductive material forming a second web is placed in the grooves 18 of the rollers 2, 3, 4, 5 and 7, and is driven in the direction indicated by the arrow with the result that the adjacent "runs" of the webs formed respectively by the two endless springs 19, 20 move in the same direction between the entering set of rollers 1, 2 and over the intermediate rollers 3, 4 and 5 and between the trailing or leaving set of rollers 6, 7. The web of material to be shrunk (not shown) enters at the rollers 1, 2 between the pair of spring webs formed by the two endless springs 19, 20, travels between these webs and the intermediate rollers 3, 4 and 5 at progressively slower speeds as the springs contract, and leaves between the rollers 6, 7. Pulleys 21 are provided to guide the springs as they pass from their lower rollers 6, 7 back to their upper support rollers 1 and 2. The upper and lower rollers such as rollers 2 and 7 are each provided with spring means 22 for urging the same in the direction of their companion rollers 1 and 6. As shown in Fig. 1, the rollers and springs and driving chains are enclosed within a casing 25 and the rollers are driven by a motor 26 located outside the casing. In the lower part of casing 25 is a trough 27 supplied with water from an external source 28, and an electrical heater unit 29 beneath the trough furnishes the necessary heat to convert the water into steam.

Because of the different velocities of the rollers, the helical springs 19, 20 will be stretched during the motion towards the upper rollers, but when they disengage the rollers at the points 30, 31, 32, 33 and 34 they are contracted again, the knitted fabric being shrunk in the longitudinal direction. Also, because of the fact that the flights of the endless springs converge from each side toward the center in the direction of motion of a web of knitted material through the machine, the knitted fabric will also be worked in the transverse direction to establish alternate grooves and ridges running in the direction of travel of the fabric between the spring webs. Thus the knitted fabric will be corrugated which adds to its appearance.

The arrangement of traveling spring webs as described above is disclosed and claimed in the aforesaid Rosen application Serial No. 409,992.

As indicated in the introductory part of this specification, better results have been found to be obtainable if the endless helical springs are heated electrically. The electric current can be supplied to and removed from the helical springs by means of sliding contacts which either slide directly against the springs themselves or against a pair of rollers around which the helical springs are driven. In the present embodiment a sliding contact 34' connected to one side of a source of voltage, as indicated schematically by a + sign, slides in contact with the spring 19 at the left end of roller 1 and a second sliding contact 35' connected to the other side of the voltage source, as indicated by the − sign, slides in contact with spring 19 at the right side of roller 1. This establishes a closed path for current flow through the endless spring 19. A similar arrangement is provided for the other helical spring 20. The heat produced by the passage of current through the springs will be equal to the square of the current multiplied by the electrical resistance of the springs.

What I claim is:

1. In an apparatus for shrinking a web of knitted fabric, a pair of webs of endless electrically conductive helical springs having adjacent runs disposed in web feeding relation and between which runs the fabric web is passed for shrinking, said helical springs forming each web being spaced apart and extending longitudinally in the direction of travel of the fabric web, a plurality of rollers for mounting said endless springs, said rollers being arranged along the direction of travel of the fabric web and being in contact with said adjacent runs of said endless springs, means for driving said rollers at progressively slower speeds in the direction of travel of the fabric web thereby to effect a correspond progressive contraction of said adjacent runs of said springs and thereby to condense the fabric web, and means for passing an electrical current through said endless springs for heating them.

2. Apparatus as defined in claim 1 for shrinking a fabric web and which includes stationary contact device means along which said springs slide for passing current into said springs.

References Cited in the file of this patent

FOREIGN PATENTS 165,332    Australia ---------------- May 6, 1954